United States Patent
Lamb et al.

(10) Patent No.: US 7,290,159 B2
(45) Date of Patent: Oct. 30, 2007

(54) FIXED LATENCY DATA COMPUTATION AND CHIP CROSSING CIRCUITS AND METHODS FOR SYNCHRONOUS INPUT TO OUTPUT PROTOCOL TRANSLATOR SUPPORTING MULTIPLE REFERENCE OSCILLATOR FREQUENCIES

(75) Inventors: Kirk D. Lamb, Kingston, NY (US); Kevin C. Gower, LaGrangeville, NY (US); Thomas J. Griffin, Salt Point, NY (US); Steven J. Hnatko, Poughkeepsie, NY (US); Dustin J. VanStee, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 458 days.

(21) Appl. No.: 10/853,423

(22) Filed: May 25, 2004

(65) Prior Publication Data
US 2005/0268135 A1    Dec. 1, 2005

(51) Int. Cl.
*G06F 1/12*    (2006.01)
*G06F 13/42*   (2006.01)
*H04L 5/00*    (2006.01)
*H04L 7/00*    (2006.01)

(52) U.S. Cl. ..................... 713/401; 713/400

(58) Field of Classification Search ............. 713/400, 713/401
See application file for complete search history.

(56) References Cited

U.S. PATENT DOCUMENTS

| | | | |
|---|---|---|---|
| 5,923,193 A * | 7/1999 | Bloch et al. | 327/141 |
| 6,516,420 B1 * | 2/2003 | Audityan et al. | 713/400 |
| 6,738,917 B2 * | 5/2004 | Hummel et al. | 713/400 |
| 7,110,423 B1 * | 9/2006 | Sethuram et al. | 370/519 |
| 7,111,184 B2 * | 9/2006 | Thomas et al. | 713/401 |
| 2002/0087909 A1 * | 7/2002 | Hummel et al. | 713/400 |

* cited by examiner

*Primary Examiner*—Rehana Perveen
*Assistant Examiner*—Michael J. Brown
(74) *Attorney, Agent, or Firm*—Lynn L. Augspurger

(57) ABSTRACT

A synchronous input to output protocol translator supporting multiple reference oscillator frequencies and fixed latency data computation and chip crossing circuits enables implementation of a method for delaying $osc_2$ relative to $osc_1$ in a configurable way to provide a constant, minimal $T_{ptcc}$ over a range of refosc frequencies between circuits for data transferred. It requires that the data transferred from a register $R_1$ be sent over multiple wires via configurable delay circuitry for $osc_2$, capture circuitry at the input to $R_2$, and a circuit to transfer a synchronizing signal from a non-delayed clock domain to a delayed clock domain. Relative to $osc_1$, $osc_2$ is a delayed, synchronous clock.

20 Claims, 6 Drawing Sheets

Signal is delayed by two clock periods plus the value of the delay.

_US 7,290,159 B2_

FIXED LATENCY DATA COMPUTATION AND CHIP CROSSING CIRCUITS AND METHODS FOR SYNCHRONOUS INPUT TO OUTPUT PROTOCOL TRANSLATOR SUPPORTING MULTIPLE REFERENCE OSCILLATOR FREQUENCIES

BACKGROUND OF THE INVENTION

1. Field of the Invention

This invention relates to computer processing systems, and particularly to a synchronous input to output protocol translator supporting multiple reference oscillator frequencies and fixed latency data computation and chip crossing circuits.

2. Description of Background

Definitions:

register: a clocked data storage device of one or more data bits.

ASIC: Application Specific Integrated Circuit. A computer chip. In today's technologies, these chips are rectangular, and their xy dimensions are measured in millimeters in single or double digits. At typical frequencies, the time of flight of an electrical pulse from one point on the ASIC to another can be significant relative to the period of the reference oscillator.

synchronous oscillators: oscillators derived from the same reference oscillator. They are in phase with each other, with the same period.

delayed synchronous oscillator: an oscillator derived from the same reference oscillator as another, but delayed relative to the other. The two derived oscillators are not in phase with each other.

combinatorial logic: circuits which perform a Boolean operation, or a sequence of them, but do not store data. Combinatorial logic contains no registers.

It would be desirable to perform protocol translation and chip crossing in a minimal amount of time for all systems operating over a range of frequencies. Furthermore a solution would be useful in ASIC designs even if they will operate at only a single frequency.

SUMMARY OF THE INVENTION

In accordance with the preferred embodiment of our invention a synchronous input to output protocol translator supporting multiple reference oscillator frequencies and fixed latency data computation and chip crossing circuits enables implementation of a method for delaying $osc_2$ relative to $osc_1$ in a configurable way to provide a constant, minimal $T_{ptcc}$ (ptcc: protocol translation and chip crossing) over a range of refosc frequencies between circuits for data transferred. It requires that the data transferred from a register $R_1$ be sent over multiple wires, configurable delay circuitry for $osc_2$, capture circuitry at the input to $R_2$, and a circuit to transfer a synchronizing signal from a non-delayed clock domain to a delayed clock domain. Relative to $osc_1$, $osc_2$ is a delayed, synchronous clock.

Additional features and advantages are realized through the techniques of the present invention. Other embodiments and aspects of the invention are described in detail herein and are considered a part of the claimed invention. For a better understanding of the invention with advantages and features, refer to the description and to the drawings.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

The detailed description explains the preferred embodiments of the invention, together with advantages and features, by way of example with reference to the drawings and the Table 1 hereinbelow.

DETAILED DESCRIPTION OF THE INVENTION

The base task is to compute and transmit an input protocol $P_1$ from one register $R_1$ on a synchronous ASIC to an output protocol $P_2$ at another register $R_2$ on the same ASIC in a clocked system, on an ASIC which may be installed in multiple systems, all operating at different reference oscillator frequencies. Let such an ASIC be called $ASIC_{ptcc}$ (Application Specific Integrated Circuit: Protocol Translation and Chip Crossing). The problem solved by this invention is that it is desirable to complete this protocol translation and chip crossing in a minimal amount of time for all systems operating over a range of frequencies. This invention could also offer a performance advantage for some ASIC designs even if they will operate at only a single frequency.

Figure 1:
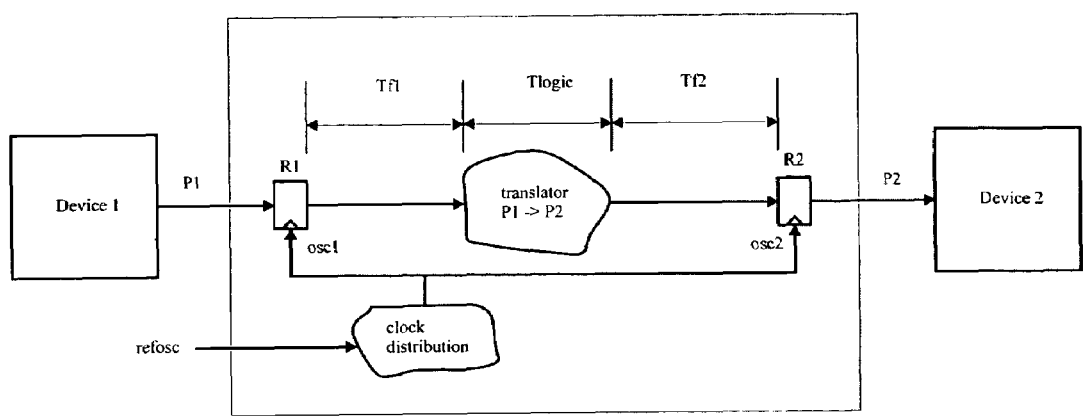
FIG. 1 illustrates the PTCC Example System

Basic Solutions:

FIG. 1 provides an illustration of a specific case of protocol translation and chip crossing (PTCC), but it can be used to generalize to any case of PTCC. $ASIC_{ptcc}$ is in a system with devices $D_1$ and $D_2$. Device $D_1$ issues protocol 1, $P_1$, to $ASIC_{ptcc}$ over the $P_1$ bus. $ASIC_{ptcc}$ translates $P_1$ to protocol 2, $P_2$, and issues $P_2$ over the $P_2$ bus to device $D_2$. $P_1$ arrives on the $P_1$ bus and is clocked into register $R_1$ with clock $osc_1$. $ASIC_{ptcc}$ must perform the translation from $P_1$ to $P_2$, and capture $P_2$ in register $R_2$ which is clocked by $osc_2$. $osc_1$ and $osc_2$ are synchronous; their phases may differ due to skew in the clock distribution tree, but ideally they are in phase. The protocol translation logic is a distinct collection of combinatorial logic, restricted to a physical region of $ASIC_{ptcc}$. (The protocol translation logic is in this example lumped together and restricted to a specific physical area to simplify the example. In general, the protocol translation logic can be distributed throughout the chip, so that the logical operation time is mingled with the times of flight, and they are no longer distinct. This delay would still constitute $T_{ptcc}$.) The cloud labeled "translator $P_1$->$P_2$" represents combinatorial logic which calculates an output protocol, $P_2$, from input protocol $P_1$. The amount of time to perform the translation from $P_1$ to $P_2$ is $T_{logic}$. FIG. 1 is intended to be both physically and logically descriptive; the times of flight of electrical pulses from $R_1$ to the command translation logic, $T_{f1}$, and from the command translation logic to $R_2$, $T_{f2}$, are non-negligible. They can be as large or larger than the computation time $T_{logic}$. To simplify the discussion that follows, the clock-to-Q time for $R_1$, and the setup time for $R_2$, are lumped into $T_{f1}$ and $T_{f2}$ respectively. (For any particular ASIC, $T_{ptcc}$ could be dominated by either time-of-flight, or time for protocol translation. It would still be $T_{ptcc}$. At the extremes, $T_{ptcc}$ could be either purely a time-of-flight, or purely a logic delay.)

The maximum frequency, $f_{refoscmax}$, of any system of $D_1$, $ASIC_{ptcc}$, and $D_2$ can be limited by the maximum supported frequency of any of $D_1$, $ASIC_{ptcc}$, or $D_2$. In two different systems, for example, $ASIC_{ptcc}$ could be attached to different generations of devices $D_2$. A device $D_2$ from a later generation could support a higher frequency than a device $D_2$ from an earlier generation. The data rate on bus $P_2$ is proportional to the frequency $f_{refosc}$.

The clocks for registers $R_1$ and $R_2$, clock $osc_1$ and clock $osc_2$, are derived from the same reference oscillator, refosc. $T_{ptcc}$ is the time required, beginning with the rising edge of $osc_1$, to launch data from $R_1$, perform all logical computation and signal propagation, and capture $P_2$ in $R_2$ on the rising edge of $osc_2$.

A fast system is defined as a system in which both $ASIC_{ptcc}$ and $D_2$ can operate at $f_{refoscmax}$. A slow system is one in which $ASIC_{ptcc}$ can operate at $f_{refoscmax}$, but $D_2$'s maximum supported frequency is less than $f_{refoscmax}$.

In FIG. 1, assume that $T_{f1}$ is 1.0 ns, $T_{logic}$ is 1.4 ns, $T_{f2}$ is 1.3 ns, and that $f_{refoscmax}$ is 533 MHz, so that a maximum data rate on bus $P_2$ supported by the fastest available device $D_2$ can be achieved. Assume that for the slow system, the maximum frequency supported by device $D_2$ is $f_{refosc}$=200 MHz.

FIG. 1. PTCC Example System

Basic solution 1: Have no registers to store information between $R_1$ and $R_2$. $osc_1$ and $osc_2$ are synchronous. The time to translate the protocol and cross the chip is $T_{ptcc}=T_{f1}+T_{logic}+T_{f2}=3.7$ ns. $f_{refosc}$ is limited by $T_{ptcc}$. Assuming no frequency division or multiplication in the clock distribution, $f_{refosc}=1/T_{ptcc}$.

Drawback to basic solution 1: Since $T_{ptcc}>1/f_{refoscmax}$, the data rate of the fast system is penalized. The data rate on the $P_2$ bus will be less than that supported by $D_2$. Table 1 shows that a solution 1 fast system suffers no latency penalty, but does suffer a bandwidth penalty. The solution 1 slow system suffers no bandwidth penalty, but it suffers a latency penalty 1.35 times that of an ideal solution.

Basic solution 2: Implement pipelining stages between $R_1$ and $R_2$ to store partial computations. With n pipelining stages, $f_{refosc}$ is limited by $1/T_{imax}$, where $1<=i<=n$, $T_i$ is the time to compute and propagate signals between any two adjacent pipeline registers, and $T_{imax}=\max(T_1, T_2, \ldots, T_n)$. The example of FIG. 1 is modified in FIG. 2 to illustrate such a solution. Pipeline registers have been added to capture the data after $T_{f1}$ into $R_{pipe1}$, and after the translation into $R_{pipe2}$.

Figure 2:
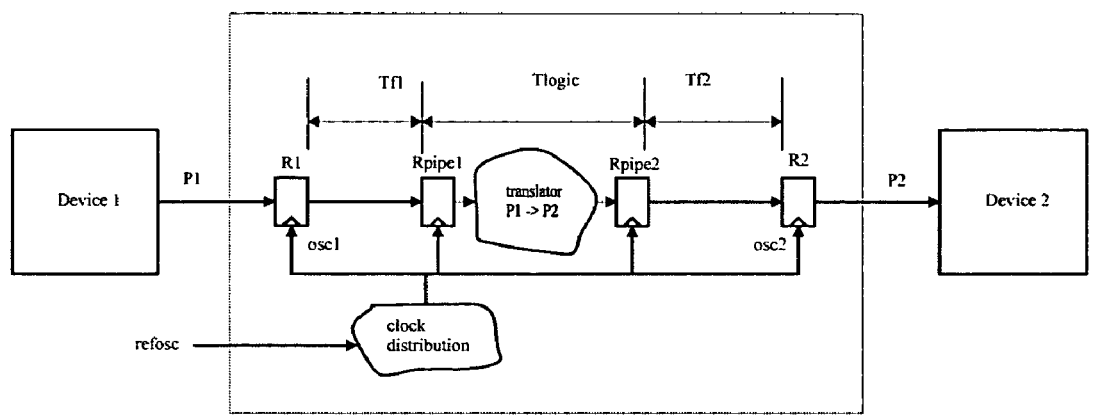
FIG. 2 illustrates the Pipeline Solution for Example System

FIG. 2. Pipeline Solution for Example System

Drawbacks to basic solution 2: An advantage of solution 2 over solution 1 is that the data rate on the $P_2$ bus can be higher than solution 1, because $T_{imax}$ of solution 2 is less than $T_{ptccsolution1}$. In the ideal case, $T_{ptccsolution2}=n*T_{imax}$, and $T_{ptccsolution2}=T_{ptccsolution1}$. But this ideal case requires that each $T_i$ be identical, and that the number of pipelining registers is such that $1/T_{imax}=f_{refoscmax}$, which will almost never happen in practice. An ideal pipelining solution for FIG. 1 would have been a single pipelining register, but this was impractical in this example because the translation logic could not be reasonably divided into two nearly balanced sections. The delay of $T_{logic}$ limits $f_{refosc}$ to 714 MHz, but $f_{refosc}$ is already limited to 533 MHz by bus $P_2$. The pipeline solution has enabled solution 2 to run at maximum frequency, but not at the frequency of the slowest pipeline stage. For a fast system, the latency of solution 2 is therefore $3*1.875$ ns=5.625 ns, which is 1.5 times the ideal. Solution 2 has an even worse latency disadvantage for the slow system. In FIG. 2, $T_{ptcc}=3*T_{refosc}$. Since the slow system is operating at $f_{refosc}$=200 MHz. The latency would then be 15 ns, which is four times the optimal latency. This is shown in table 1.

Basic solution 3: Implement multiple pipelining solutions within $ASIC_{ptcc}$, and select a pipelining solution based on configuration data in $ASIC_{ptcc}$, based upon the $T_{refosc}$ of the system. As an example, let FIG. 2 be the pipelined design for the fast system. At the slow system's frequency of 200 MHz, neither pipeline register is necessary. Add muxes to the design so that the pipeline registers can be bypassed, based on a mode select signal. The fast system of solution 3 would then perform as solution 2, and the slow system of solution 3 would perform as solution 1. This is shown in table 1.

TABLE 1

Comparison of data rate and latency for various solutions

| Solution | frefosc, MHz data rate relative Tptcc, ns to maximum of device D2, % | | Tptcc/ Ideal Tptcc |
|---|---|---|---|
| ideal solution fast | 533 | 100 | 3.7 | 1 |
| ideal solution slow | 200 | 100 | 3.7 | 1 |
| solution 1 fast | 270 | 51 | 3.7 | 1 |
| solution 1 slow | 200 | 100 | 5 | 1.35 |
| solution 2 fast | 533 | 100 | 5.63 | 1.52 |
| solution 2 slow | 200 | 100 | 15 | 4.05 |
| solution 3 fast | 533 | 100 | 5.63 | 1.52 |
| solution 3 slow | 200 | 100 | 5 | 1.35 |
| invention fast | 533 | 100 | 3.7 | 1 |
| invention slow | 200 | 100 | 3.7 | 1 |

Drawbacks to basic solution 3: Solution 3 has multiple disadvantages. Although it reduces the latency penalty of solution 2 for the slow system, it causes a large increase in design complexity and design verification. In the example, only two system frequencies are used, but $ASIC_{ptcc}$ might be required to support a large range of frequencies, and solution 3 might require multiple pipelining solutions. Solution 3 requires more circuits, will consume more power than the other basic solutions, and will have a longer design and verification phase.

The preferred embodiment of our invention illustrated by FIGS. 3, 4, 5 and 6 employs a method which can be implemented by our circuits for delaying $osc_2$ relative to $osc_1$ in a configurable way to provide a constant, minimal $T_{ptcc}$ over a range of refosc frequencies. It requires that the data transferred from register $R_1$ be sent over multiple wires, configurable delay circuitry for $osc_2$, capture circuitry at the input to $R_2$, and a circuit to transfer a synchronizing signal from a non-delayed clock domain to a delayed clock domain. Relative to $osc_1$, $osc_2$ is a delayed, synchronous clock.

Comparison to basic solution 1. The preferred embodiment of our invention provides the same fixed latency $T_{ptcc}$ as basic solution 1, but does not penalize the fast system even if the latency time $T_{ptcc}$ is greater than $T_{refosc}$. Minimal latency at maximum frequency is achieved by delaying $osc_2$ relative to $osc_1$ by $T_{ptcc}$ over a range of $T_{refosc}$. It does not require an oscillator in addition to refosc, but additional circuits are required as described in the paragraph above.

Comparison to basic solution 2. The invention is superior to basic solution 2 for all systems. It provides the minimal possible latency for slow systems, which the pipelined solution would not. The preferred embodiment of our invention is superior because it has fewer circuits and consumes less power. It is also less complex, which reduces the design and verification effort required to bring the system to market.

Comparison to basic solution 3. The same arguments relative to basic solution 2 apply. Basic solution 3 has more circuits and is more complex than solution 2, so the invention has even greater advantages relative to number of circuits, power consumption, and design complexity. Since the invention provides an optimal $T_{ptcc}$, it has no latency disadvantage relative to basic solution 3. In the invention, both the slow and fast systems are verified in the same logical verification run, since the same logic is exercised for both systems. This is not true for solution 3. For solution 3 the slow and the fast systems require separate verification efforts.

Table 1 above shows that the preferred embodiment of our invention will enable both the fast and slow systems to operate at maximum bandwidth with minimal latency.

Figure 3:
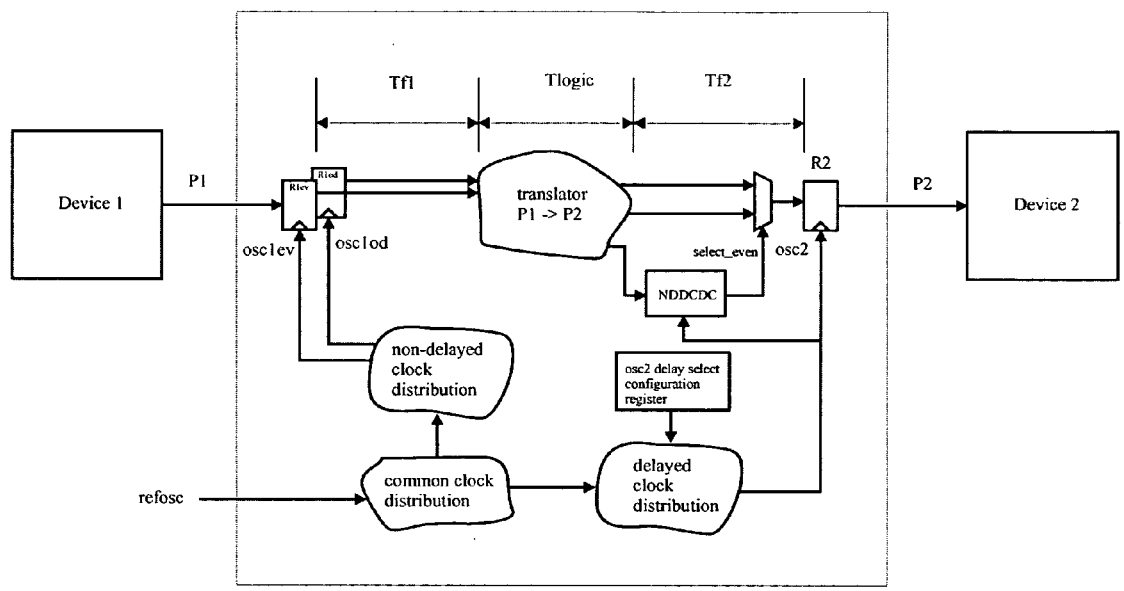
FIG. 3 illustrates a High Level Drawing of the preferred embodiment of the invention.
Figure 4:
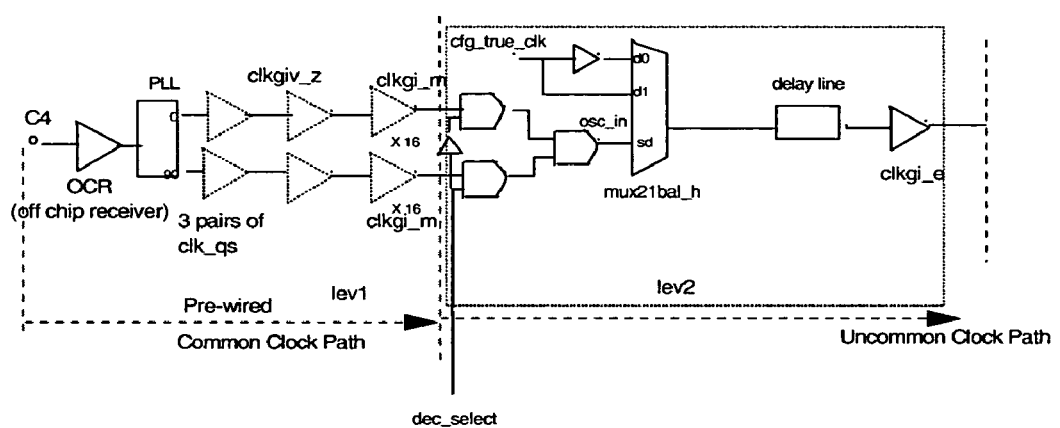
FIG. 4 illustrates the osc2 Delay Circuit.
Figure 5:
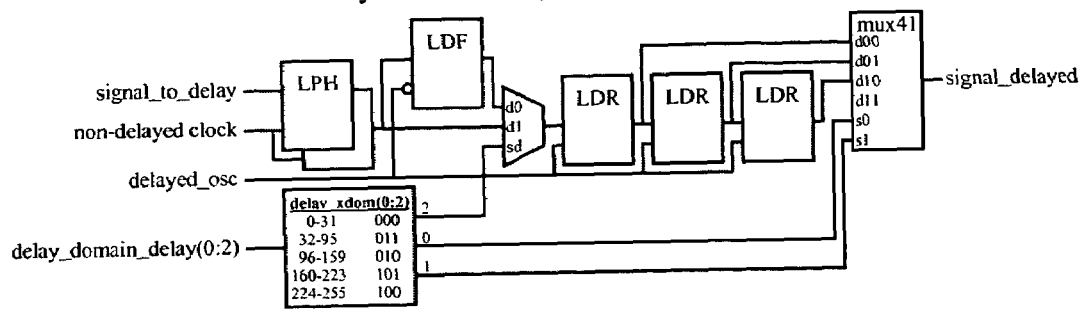
FIG. 5 illustrates the Non-delayed to Delayed Clock Domain Crossing Circuit.

FIG. 3 shows a high-level drawing of the preferred embodiment of our invention, which is similar in structure to basic solution 1 with four major differences. One difference is that a plurality of (in this example two) wires per data bit of $P_1$ are required, each of them stretched for a plurality (here two) of reference oscillator refosc periods, out of phase with each other by one refosc period. Two oscillators, $osc_{1ev}$ and $osc_{1od}$, replace $osc_1$. They are not delayed relative to refosc, but have periods twice that of refosc, and are out of phase with each other by one refosc period. The second difference is that $osc_2$ can be delayed, relative to refosc, up to two refosc cycles. The amount of delay is selected via configuration registers in $ASIC_{ptcc}$. For a fast system, $osc_2$ would be delayed a full two cycles, and $T_{ptcc}$ must be less than two refosc periods. The circuit to delay $osc_2$ is shown in FIG. 4. The third difference is that a capture mux must be added to the chip crossing capture logic, to select which of the two wires is gated into register $R_2$. This mux is shown in FIG. 3 immediately preceding $R_2$. The fourth difference is that a mux select signal must be transferred from the $osc_1$ domain into the $osc_2$ domain. The non-delayed to delayed clock domain crossing (NDDCDC) circuit is shown in FIG. 5.

Figure 6:
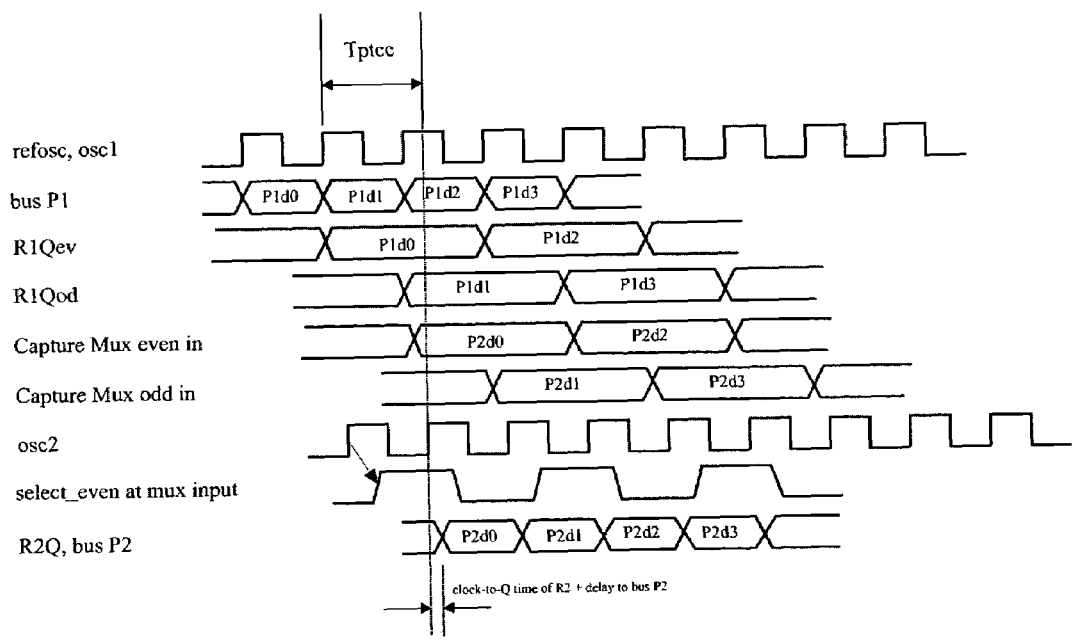
FIG. 6 illustrates the Timing Diagram of System With $T_{ptcc}=5/4*T_{refosc}$

FIG. 6 shows a timing diagram illustrating how the invention would work for a system operating at a frequency, $f_{refosc}$, less than $f_{refoscmax}$, such that $T_{ptcc}$ is slightly less then $5/4*T_{refosc}$. refosc is shown, and $T_{ptcc}$ is indicated above it. Four data shots arrive on the $P_1$ bus and are captured in the $R_1$ registers. Data is launched from the even and odd $R_1$ registers, shown as $R1Q_{ev}$ and $R1Q_{od}$, and the data from each register is stretched two refosc periods. The signals propagate through the protocol translation logic, arrive at the input to the capture mux, and are shown as Capture Mux even in and Capture Mux odd in. $osc_2$, an output of the delayed clock distribution block shown in FIG. 3, is shown in FIG. 6 delayed by 5/4 refosc cycles relative to refosc. The signal select_even is launched by a latch from the NDDCDC, which is also clocked by $osc_2$, and is shown in FIG. 6 after some propagation delay, when it arrives at the input to the capture mux. $R_2$ is modeled as a rising edge triggered flip-flop in this example. It captures the output of the mux on the rising edge of $osc_2$, and launches it after some clock-to-Q propagation time onto the $P_2$ bus. The time between the rising edge of $osc_1$ which launches P1d0, and P2d0 launched from R2Q onto bus $P_2$, is 5/4 refosc periods plus the clock-to-Q time of $R_2$ and the propagation delay of the signals onto the bus. The data out of $R_2$ is the data launched onto bus $P_2$.

The invention shown in FIG. 3 shows a method of providing minimal $T_{ptcc}$ over a range of frequencies when $T_{ptcc}$ is <$2*T_{refosc}$. This requires deserialization of an incoming protocol onto two wires. For $2*T_{refosc}<=T_{ptcc}<4*T_{refosc}$, deserialization onto four wires would be required. Such solutions can continue to be applied as $T_{ptcc}$ increases relative to $T_{refosc}$. In principle, $T_{ptcc}$ can be significantly larger than $T_{refosc}$ and a minimal latency can be maintained, as long as the design can tolerate the number of additional wires for deserializing the incoming protocol.

Note: an alternate method of implementing the invention would be to provide two reference oscillators, with the second delayed relative to the first by $T_{ptcc}$. This would require an additional pin (or pins if differential signaling is used) on the $ASIC_{ptcc}$ module, and an extra clock distribution tree within $ASIC_{ptcc}$. It moves the task of the "delayed clock distribution" block of FIG. 3 from $ASIC_{ptcc}$ into the system.

While the preferred embodiment to the invention has been described, it will be understood that those skilled in the art, both now and in the future, may make various improvements and enhancements which fall within the scope of the claims which follow. These claims should be construed to maintain the proper protection for the invention first described.

What is claimed is:

1. A synchronous input to output protocol translator system for use in chip crossing and protocol translation, comprising:

a first register coupled to a first circuit for data being transferred from a first circuit to a second circuit, a second register for said second circuit for receiving data being transferred from said first circuit to said second circuit, configurable delay circuitry including providing a coupling with a plurality of connecting wires forming part of said configurable delay circuitry and capture circuits at said second register, and transfer circuits coupling a synchronizing signal from a non-delayed clock domain to a delayed clock domain, wherein said transfer circuit is clocked by a reference clock providing reference oscillator periods from a source other than said first and said second circuits for configurably delaying a second clock ($osc_1$) relative to a first clock ($osc_1$) by an absolute value, and wherein said translator system provides a constant, minimal chip-crossing time for received data over a range of reference oscillator frequencies as data is input over input data lines via said first circuit for data and each of a plurality of data lines coupled to said first register outputs its data over two or more wires for each of said input data lines, with each of two or more data bits for the data input over said input data lines being stretched over two or more of said reference oscillator periods, and wherein said two or more wires contain the same data offset by one reference oscillator period.

2. The synchronous input to output protocol translator system according to claim 1 wherein wherein said reference oscillator is internally split into two internal oscillator signals that retain an original timing relationship to said reference oscillator, but each have a period twice that of the reference oscillator, and each have a period out-of-phase by one reference oscillator.

3. The synchronous input to output protocol translator system according to claim 2 wherein said second clock ($osc_1$) and first clock ($osc_1$) are clocks derived from said reference oscillator, and said second clock is delayed from the reference oscillator by up to two cycles of said reference oscillator, with the delay being selectable via configuration registers.

4. The synchronous input to output protocol translator system according to claim 3 wherein two oscillators representing said first clock ($osc_{1ev}$ and $osc_{1od}$) and derived from said reference oscillator are provided which are not delayed relative to said reference oscillator, but have periods twice that of said reference oscillator, and are out of phase with each other by one reference oscillator period.

5. The synchronous input to output protocol translator system according to claim 3 wherein said translator system is followed by a capture multiplexer to select one of the two or more wires for each of said input data lines for minimal latency.

6. The synchronous input to output protocol translator system according to claim 5 wherein said second clock is configurably delayed relative to said reference oscillator for a plurality of reference oscillator (refosc) cycles.

7. The synchronous input to output protocol translator system according to claim 6 wherein said capture multiplexer is coupled to a register which is clock delayed programmably by a delayed reference oscillator clock.

8. The synchronous input to output protocol translator system according to claim 7 wherein a capture multiplexer is provided for chip crossing and protocol translation logic to select which of said plurality of connecting wires is coupled to gate into said second register, and a multiplexor select signal is transferred from the domain of said first clock to the domain of said second clock to select which of said plurality of connecting wires is coupled to gate into said second register.

9. The synchronous input to output protocol translator system according to claim 3 wherein a capture multiplexer is provided for chip crossing and protocol translation logic to select which of said plurality of connecting wires is coupled to gate into said second register.

10. The synchronous input to output protocol translator system according to claim 9 wherein a multiplexor select signal is transferred from the domain of said first clock to the domain of said second clock to select which of said plurality of connecting wires is coupled to gate into said second register.

11. A method of operating a synchronous input to output protocol translator system for use in chip crossing and protocol translation, comprising the steps of:

transfering data sent from a first input register ($R_1$) over multiple wires to configurable delay circuitry for a receiving chip for receipt of information from a first device, receiving with configurable delay circuitry for a second clock domain ($OSC_2$) capture circuitry said transferred data at the input to a receiving second register $R_2$ of a second device, and transfering a signal from a synchronizing circuit to transfer a synchronizing signal from a non-delayed clock domain to a delayed clock domain wherein said transfer is clocked by a reference oscillator providing reference oscillator periods from a source other than said first and said second devices for configurably delaying a second clock ($osc_1$) relative to a first clock ($osc_1$) by an absolute value, and wherein for said transfer a second reference oscillator is developed in response to the received reference oscillator, whereby the second reference oscillator output is delayed from the reference oscillator by up to two cycles of said reference oscillator with the delay being selectable by configuration registers.

12. The synchronous input to output protocol translator system according to claim 11 wherein said plurality of connecting wires are provided per data bit of said input, and selecting a delay appropriate for said synchronous input to output protocol translator to support and applicable one of multiple reference oscillator frequencies and fixed latency data computation for chip crossing and protocol translation circuits between said circuits to transfer a synchronizing signal from a non-delayed clock domain to a delayed clock domain.

13. The synchronous input to output protocol translator system according to claim 11 wherein said second oscillator ($osc_2$) and second clock domain ($osc_2$) are clocks derived from a reference oscillator, and each of said data bits of said input are stretched for a plurality of reference oscillator (refosc) periods, out of phase with each other by one reference oscillator period.

14. The synchronous input to output protocol translator system according to claim 13 wherein two oscillators representing said first clock, ($osc_{1ev}$ and $osc_{1od}$) and derived from said reference oscillator are provided which are not delayed relative to said reference oscillator, but have periods twice that of said reference oscillator, and are out of phase with each other by one reference oscillator period.

15. The synchronous input to output protocol translator system according to claim 13 wherein a capture multiplexer is provided for chip crossing and protocol translation logic to select which of said plurality of connecting wires is coupled to gate into said second register.

16. The synchronous input to output protocol translator system according to claim 15 wherein a multiplexor select signal is transferred from the domain of said first clock to the domain of said second clock to select which of said plurality of connecting wires is coupled to gate into said second register.

17. The synchronous input to output protocol translator system according to claim 11 wherein said second clock is configurably delayed relative to said reference oscillator, and wherein each of the data lines is received in a register which outputs the data over multiple wires, with each data input stretched over two or the reference oscillator periods, and with two wires containing the same data offset by one reference oscillator cycle period.

18. The synchronous input to putout protocol translator system according to claim 17 wherein said reference oscillator is internally split into two internal oscillator signals that retain an original timing relationship to said reference oscillator, but wherein each of the two internal oscillator signals have a period twice that of the reference oscillator and out of phase thereto by one reference oscillator cycle period.

19. The synchronous input to output protocol translator system according to claim 18 wherein a capture multiplexer selects one of said two wires for minimal latency.

20. The synchronous input to output protocol translator system according to claim 11 wherein said capture multiplexer is provided for chip crossing and protocol translation logic to select which of said plurality of connecting wires is coupled to gate into said second register, and a multiplexor select signal is transferred from the domain of said first clock to the domain of said second clock to select which of said plurality of connecting wires is coupled to gate into said second register.

* * * * *